Aug. 18, 1970 L. J. DUNLOP ET AL 3,525,084

MEMORY SENSE SYSTEM WITH FAST RECOVERY

Filed Dec. 14, 1967

INVENTORS
LAWRENCE JOHN DUNLOP
PETER ROHR

BY W. S. Robertson

ATTORNEY

United States Patent Office 3,525,084

Patented Aug. 18, 1970

3,525,084

MEMORY SENSE SYSTEM WITH FAST RECOVERY

Lawrence J. Dunlop and Peter Rohr, Burlington, Vt., assignors to International Business Machines Corporation, Armonk, N.Y., a corporation of New York Filed Dec. 14, 1967, Ser. No. 690,593
Int. Cl. G11c *11/14*
U.S. Cl. 340—174 7 Claims

ABSTRACT OF THE DISCLOSURE

This disclosure teaches an arrangement of a bit driver, a sense amplifier, and a bit-sense wire in a magnetic memory to reduce the recovery time of the bit-sense wire at the end of a write operation. In an embodiment that is described in detail, one end of the bit-sense line is connected to a driver and the other end is connected to a conductive ground plane which forms a return current path. The sense amplifier is connected to sense voltages that occur between a midpoint of the bit-sense wire and a corresponding midpoint on the ground plane. Noise voltages associated with eddy currents in the bit-sense wire and particularly in the ground plane have been founded to be zero at this point.

BACKGROUND

Although magnetic storage devices are well known, it will be helpful to consider a specific memory that illustrates the principles and the terminology that particularly apply to this invention. The elements of a storage device can be given a residual magnetism in either of two directions to represent a logical one or zero. The storage elements are arranged in rows and columns. The elements of a column (arbitrarily) form the bit positions of a unit of data called a word. The elements in a row form a particular bit position of all of the words. For each word there is a column wire called a word wire that is coupled to each storage element of the associated word. For each bit position there is a bit-sense wire that is coupled to each storage element of the associated row. In a write operation, a current is applied to one wire to selected the addressed word, and the bit wires are energized in a pattern to represent a word of data. (The bit curernt is below a threshold level required for switching and does not switch the elements of the unaddressed words.) For a read operation, only the word wire is energized and the voltages associated with the change in magnetism appear on the bit-sense wires. For each bit position a sense amplifier is connected to receive the signal on the associated bit-sense wire and to produce an output at the voltage levels that are used to represent logic variables in the system associated with the memory.

A memory operating cycle is made up of a read operation followed by a write operation. Thus in a sequence of memory cycles, a read operation of one cycle follows the write operation of a preceding cycle. A general object of this invention is to provide an improved circuit for detecting the signal in the presence of electrical noise voltages that occur when the bit current is turned off at the end of a preceding write operation. (This source of noise is to be distinguished from the bit voltages that occur while the bit driver is on for a write operation.)

To energize a bit-sense wire for a write operation, a circuit called a bit driver is turned on to apply a predetermined current to the wire. The current concentrates on the surface of the ground-plane and stripline due to eddy currents produced in the two conductors. This phenomenon is usually called skin effect. The eddy currents oppose penetration of the magnetic field into the conductors when the driving pulse is turned on. Once the field is built up in the conductors the eddy-currents opposed the decay of the field when the driving pulse is turned off. The magnetic field persists therefore for a long time in the conductor. This slowly decaying field produces a residual voltage across the conductor and therefore across the terminating resistor of the bit-sense wire. A read operation cannot take place until the residual voltage has decayed sufficiently that the signal of the storage element can be distinguished from the voltage on the bit-sense wire. Thus a reduction in the noise on the bit-sense line permits the memory to be operated faster.

It has been particularly difficult to avoid noise in memories having conductive ground planes. After the rise of the bit current, the current spreads in the ground into a wide, high conductance path. The high conductivity of the ground plane gives the circuit a long time constant and thereby causes the noise voltages to persist long after the bit drivers are turned off. To overcome these disadvantages, the prior art has suggested forming the ground plane as only a thin layer on a non-conductive substrate. The prior art has also suggested using only a non-conductive substrate where a conductive ground plane would have been advantageous except for the noise problem. The prior art has also suggested connecting bit-sense wires in pairs with a differential sense amplifier such that noise voltages appear about equally on both bit-sense wires and tend to cancel in the differential sense amplifier.

THE INVENTION

According to this invention the sense amplifier is connected between the midpoint of the bit-sense wire and a corresponding midpoint of the conductive ground plane. We have found that at this point the noise voltages associated with the eddy currents are zero. This effect can be understood by considering the eddy currents as they are represented by four voltage sources located in the two sides of the ground plane and the two sides of the bit-sense wire. The four sources have the same polarity around the conductive loop formed by the bit-sense wire, the ground plane, and associated circuit components (by Lenz's law). The two ground plane sources have equal amplitudes and the two bit-sense wire sources have equal amplitudes. These sources produce corresponding voltage drops around the circuit loop. Thus, by symmetry, the noise voltage across the sense amplifier terminals is zero.

The zero voltage effect just described also applies to circuits that have conventional terminating resistances at either or both ends of the bit-sense wire. The exact point where the voltages cancel may be shifted toward the bit driver in circuits where the sense amplifier has an appreciable input conductance. To the extent that the sense amplifier draws current from the bit driver during a write operation, more energy is stored in the section of the ground plane and bit-sense wire nearest the bit driver than is stored in the parts remote from the bit driver. The position of the sense amplifier connections can easily be adjusted to compensate for this effect.

The foregoing and other objects, features and advantages of the invention will be apparent from the following more particular description of a preferred embodiment of the invention, as illustrated in the accompanying drawings.

THE DRAWING

THE MEMORY OF FIG. 1

Figure 1:
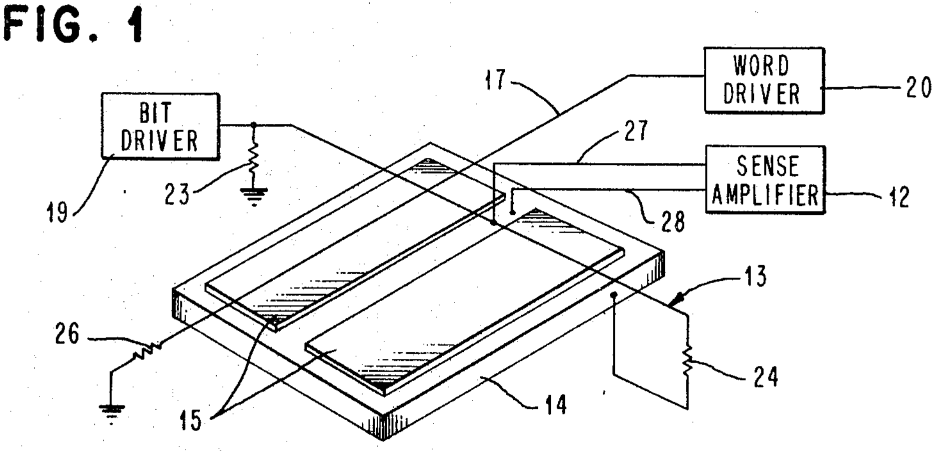
FIG. 1 is a simplified isometric view of the memory of this invention.

FIG. 1 shows the structural relationship of a sense amplifier 12 to a bit-sense wire 13, a ground plane 14, and other components of a thin film magnetic memory. The ground plane 14 forms a substrate for a thin film 15 of nickel-iron. A set of bit wires illustrated by the single wire 13 and a set of word wires represented by a single wire 17 are positioned at right angles to each other over the magnetic film. A bit driver 19 for each bit wire and a word driver 20 for each word wire are controlled to provide suitable currents for read and write operations. The bit-sense wire 13 is terminated in its characteristic impedance at each end by means of resistors 23 and 24. A resistor 26 similarly terminates the word wire at the end remote from the word driver.

According to this invention, one terminal 27 of sense amplifier 12 is connected to the bit-sense wire 13 at about the midpoint of the wire and the other terminal 28 is connected to the ground plane at a corresponding point. As FIG. 1 shows, the film 15 is suitably arranged to provide an electrical connection between terminal 28 and the ground plane. The electrical significance of this arrangement is illustrated in FIG. 2 which will be described next.

THE CIRCUIT OF FIG. 2

Figures 2, 3:
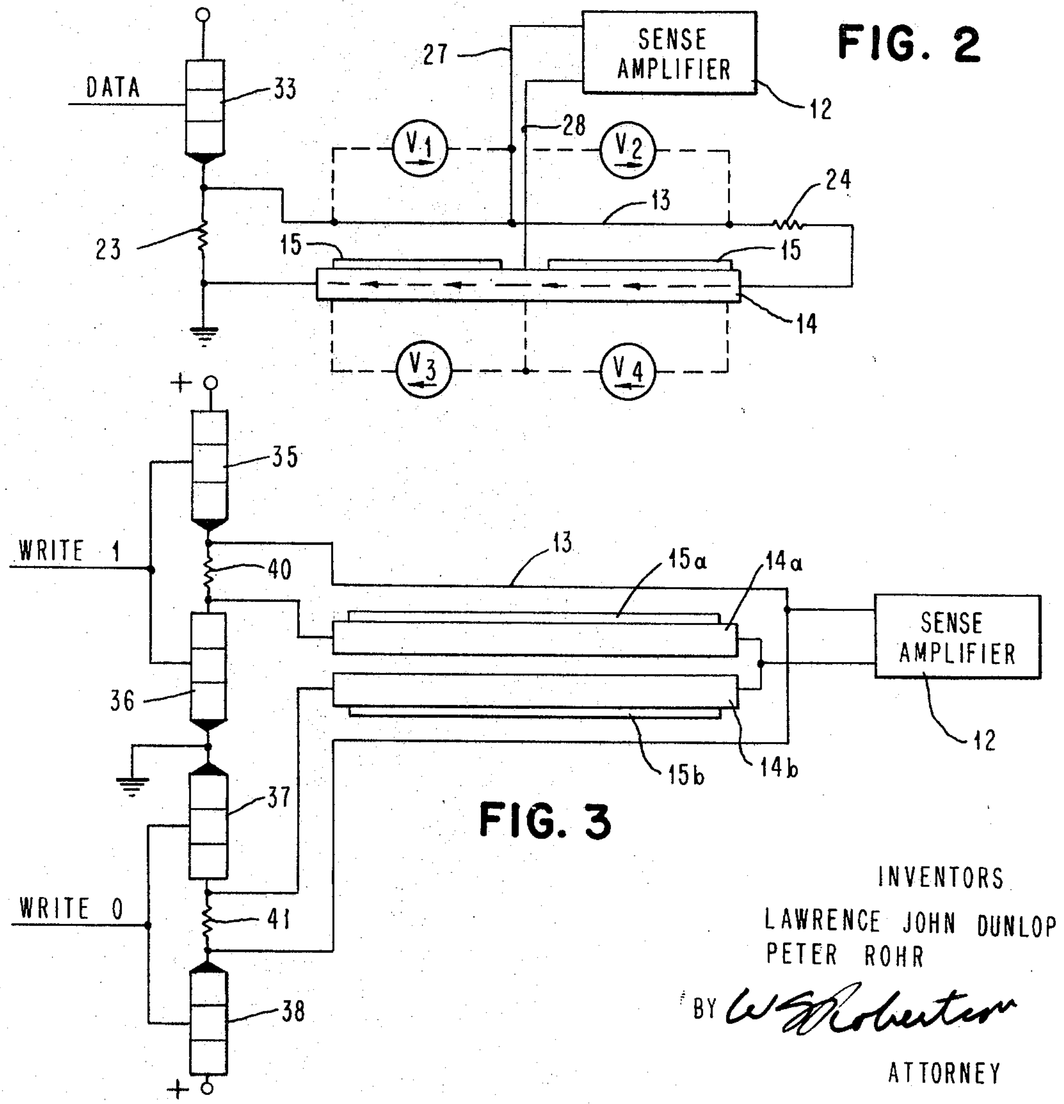
FIG. 2 is a more detailed schematic showing of the memory of FIG. 1.
FIG. 3 shows another embodiment of the invention.

The memory of FIG. 2 is similar in general details to the memory of FIG. 1 and corresponding components have similar numbers to show how FIG. 2 is orientated with respect to FIG. 1. The bit driver 19 of FIG. 1 is shown in more detail in FIG. 2 as a transistor 30 having its collector terminal connected to a suitable point of potential, its base terminal connected to receive a signal representing data, and its emitter terminal connected to the junction of terminating resistor 23 and bit-sense wire 13. The bit-sense wire 13 is connected at its remote end to the ground plane 14 so that the ground plane forms a return path for bit current which is shown in FIG. 2 as a sequence of arrows.

When the transistor 30 is first turned on for a write operation, current flows in the circuit of the transistor, bit-sense wire 13, terminating resistor 24, and the ground plane 14. This circuit has resistance and inductance, and the current level increases to a predetermined value according to the RL time constant of the circuit.

During the rise of the bit current, the voltages associated with the inductance of the circuit cause currents in the ground plane to be restricted to a narrow region under the bit-sense wire. By contrast, when the bit current has reached its maximum level, the current in the ground plane spreads to occupy a wider cross section of the ground plane. As will be explained next, the high conductance of the ground plane makes recovery of the bit-sense wire more difficult.

When the transistor 30 is turned off at the end of a write operation, the circuit of the bit-sense wire includes the terminating resistors 23, 24, the ground plane, and wire 13. The bit current falls to zero approximately according to the RL time constant of the circuit. Because the ground plane has a high conductance the current tends to persist for a relatively long time. Considered from a somewhat different standpoint, there is only a low resistance in which to dissipate the energy stored in the magnetic field of the bit current. As the bit current falls to zero, a corresponding voltage appears in the circuit. In memories in which the sense amplifier is connected to sense the voltage across one of the terminating resistors, about half of this voltage appears as noise at the sense amplifier input terminals.

This invention is based in part on the discovery that the noise voltages that exist during the bit recovery period can be analysed as two approximately equal sources V1 and V2 associated with wire 13 and two approximately equal sources V3 and V4 associated with the ground plane. The sources have a polarity in the direction of the bit current. By Kirchoff's law, the sum of these voltages is equal but opposite to the sum of the voltage drops in the circuit. In the circuit of FIG. 2 the terminating resistors have equal resistances (as is conventional) and the impedance associated with sources V1 and V3 equals the impedance associated with the sources V2 and V4. Thus, by symmetry, the voltage drops and the source voltages are equal and opposite in the circuit portion of sources V1 and V3 and resistor 23 (or similarly, in the circuit portion of sources V2 and V4 and resistor 24). Consequently, the voltage is zero across terminals 27 and 28 of the sense amplifier, and a signal can be detected at these terminals free of this source of noise.

In the example of FIG. 2, the sense amplifier terminals are connected to the geometrical midpoints of the bit-sense wire and the ground plane. In other circuits the appropriate connection points are close to but spaced somewhat from the geometrical midpoints. For example, the admittance of the sense amplifier between terminals 27 and 28 may be high enough to draw an appreciable bit current that flows only in the circuit of sources V1 and V3. With the sense amplifier connections at the geometrical midpoints, source V1 would be higher than source V2 and source V3 would be higher than source V4, and a small voltage would appear across the sense amplifier terminals during a read operation. Preferably terminals 27 and 28 are moved toward the bit driver sufficiently to equalize sources V1 and V2 and sources V3 and V4.

THE CIRCUIT OF FIG. 3

In the memory of FIG. 3 the ground plane is formed in two parts **14*a* and 14*b* with corresponding film elements 15*a* and 15*b***. This construction simplifies the connection between the midpoints of the ground plane and bit-sense wire and the sense amplifier input terminals. Preferably, the ground plane and bit-sense wire structure is folded so that the bit driver is located on one side and the sense amplifier is located on the other side.

FIG. 3 also illustrates the invention in relation to a more detailed bit driver which provides bit current of one polarity for writing a 1 and a bit current of the other polarity for writing a 0. The bit driver includes 4 transistors 35, 36, 37, and 38 that are connected with two terminating resistors 40 and 41. To write a 1, transistors 35 and 36 are turned on and a current path is established through these elements: transistor 35, wire 13, resistor 41, ground plane **14*b* ground plane 14*a*, and transistor 36 to ground. Transistors 37 and 38** similarly establish a current path of opposite polarity to write a 0. The electrical relationship of the sense amplifier to the bit-sense wire and ground plane and to the noise voltages is the same as the relationship for the circuit of FIG. 2.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A memory comprising, an array of storage elements, bit wires coupled to the elements of an associated bit position of the memory, a ground plane in close proximity to said bit-wires and connected to one end of each of said bit wires to form a return current path for said bit wires, and bit drivers connected to the other end of each of said bit wires individually and to said ground plane for producing a current in the circuit of a bit wire and said ground return path for a write operation on the memory, a sense amplifier for each bit position, each sense amplifier having a pair of input terminals, means for each sense amplifier connecting one of said terminals to the associated bit wire at a predetermined point between the ends of the bit wire where portions of said wire on opposite sides of said point form first and second sources of noise voltage when the associated bit driver is turned off and connecting the other terminal to said ground plane at a predetermined point between the ends of said return current path where portions of said ground return path, on opposite sides of said point form two noise voltage sources cancelling the noise in the bit wire at said terminals, impedance means located in each of said portions, said impedance means having values related to the voltage of the noise in the associated portion to produce zero noise voltage across said pair of terminals following a write operation.

2. A memory according to claim 1 in which said impedance means includes equal value terminating resistors connected between the ends of the bit wire and the ends of the current path in the ground plane.

3. A memory according to claim 2 in which said other terminal is connected at the midpoint of said return current path.

4. A memory according to claim 2 in which said one terminal is connected at the midpoint of said bit wire and said other terminal is connected at the midpoint of said return current path.

5. A memory according to claim 2 in which each said sense amplifier has appreciable admittance across its pair of terminals whereby the current in one of said portions is higher than the current in the other of said portions during a write operation and in which the connection points of said sense amplifier to said bit wire and to said ground plane are located at predetermined points offset from the midpoints of said wire and said return path in a direction to equalize the noise voltages on the two portions.

6. A memory comprising, an array of storage elements, bit wires coupled to the elements of an associated bit position of the memory, a ground plane in close proximity to the bit wires, and means for connecting one end of a bit wire to said ground plane and the opposite end to a source of potential for a write operation on the memory to produce a selected current in the bit wire and a return current path formed by said ground plane, a sense amplifier for each bit position, each sense amplifier having two terminals, and means connecting one of said terminals to the associated return path at its midpoint and connecting the other terminal to the associated bit wire at a point near the midpoint where noise voltages on opposite sides of said return path midpoint cancel the noise voltages on opposite sides of said point on said bit wire.

7. A memory according to claim 6 in which said means for connecting the ends of said bit wire includes like value terminating resistors at each end of said bit wire whereby the portion of the bit wire and return path on one side of said terminals has approximately the same impedance as the portion on the other side of the terminals.

References Cited

UNITED STATES PATENTS 3,304,543 2/1967 Louis et al. ---------- 340—174

OTHER REFERENCES

IBM Technical Disclosure Bulletin, "Magnetic Film Memories" by Jutzi, vol. 7, No. 1, June 1964, pp. 15–16, 340–174.

STANLEY M. URYNOWICZ, Jr., Primary Examiner